(12) United States Patent
Rossi et al.

(10) Patent No.: US 6,251,974 B1
(45) Date of Patent: Jun. 26, 2001

(54) POLYAMIDE RELEASE FILM FOR USE IN THE PRODUCTION OF MOLDED COMPOSITE PRODUCTS

(75) Inventors: Sharon Anne Rossi; Oliver Harold Vogt, both of Whitby (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/349,168

(22) Filed: Jul. 9, 1999

Related U.S. Application Data

(63) Continuation-in-part of application No. 08/828,919, filed on Mar. 28, 1997, now Pat. No. 5,959,031.
(60) Provisional application No. 60/017,564, filed on May 14, 1996, and provisional application No. 60/014,615, filed on Mar. 29, 1996.

(51) Int. Cl.[7] .................................................. C08L 77/00
(52) U.S. Cl. ........................ 524/230; 524/227; 524/228; 524/229; 524/232
(58) Field of Search ............................ 428/352; 524/227, 524/228, 229, 230, 232

(56) References Cited

U.S. PATENT DOCUMENTS

| | | |
|---|---|---|
| 3,755,221 | 8/1973 | Hitch . |
| 4,444,829 | 4/1984 | Bollen et al. ........................ 428/220 |
| 4,490,324 | 12/1984 | Mollison ............................. 264/211 |
| 4,694,063 | 9/1987 | Hillaire et al. ...................... 528/315 |

Primary Examiner—Ana Woodward

(57) ABSTRACT

A film for adhering to a molding compound paste composite during its manufacture, said film being formed from a blend of a film forming polyamide resin and at least one release agent material selected from the group consisting of N, N' ethylene bis amides of the formula:

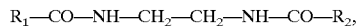

wherein $R_1$ is an aliphatic hydrocarbon chain of about 14 to about 42 carbon atoms, and $R_2$ is a hydrogen atom or an aliphatic hydrocarbon chain of about 14 to about 42 carbon atoms; calcium stearate; a mixture of calcium stearate and silicone; a mixture of calcium stearate and polytetrafluoroethylene; polypropylene; modified polypropylene; waxes; fluoroelastomers; silicones; molybdenum disulphide; boron nitride; N, N' ethylene bis stearamide and polytetrafluoroethylene; N, N' ethylene bis stearamide and silicone; N, N' ethylene bis stearamide and graphite; N, N' ethylene bis stearamide and polypropylene; N, N' ethylene bis stearamide and molybdenum disulphide; waxes and polytetrafluoroethylene; waxes and silicone; polytetrafluoroethylene and silicone; polytetrafluoroethylene and maleic anhydride modified polypropylene; silicone and graphite; silicone maleic anhydride modified polypropylene; calcium stearate and molybdenum disulphide; calcium stearate and boron nitride; calcium stearate and polytetrafluoroethylene; calcium stearate and graphite; waxes and maleic anhydride modified polypropylene; polytetrafluoroethylene and graphite; polytetrafluoroethylene, silicone, graphite and molybdenum disulphide or boron nitride; and molybdenum disulphide and boron nitride, with the proviso that any modified polypropylene present does not exceed 3% by weight and wherein the release agent material is present in an amount such that after the paste composite is formed, substantially all of the film can be removed from the surface of the composite.

18 Claims, 1 Drawing Sheet

POLYAMIDE RELEASE FILM FOR USE IN THE PRODUCTION OF MOLDED COMPOSITE PRODUCTS

RELATED APPLICATION

This application is a continuation-in-part of U.S. patent application Ser. No. 08/828,919, filed Mar. 28,1997 now U.S. Pat. No. 5,959,031, which claims priority to U.S. Provisional Applications No. 60/014,615, filed Mar. 29, 1996 and Ser. No. 60/017,564, filed May 14,1996.

FIELD OF THE INVENTION

This invention relates to polyamide film having improved slip characteristics suitable for use as a release sheet in the preparation of molding composites, such as sheet molding compound (SMC), thick molding compound (TMC) and bulk molding compound (BMC) which are generally used in the manufacture of vehicle parts and components. These composites have other applications, such as in the manufacture of plumbing fixtures, for example one-piece tubs, showers, hot tubs, whirlpools and the like.

BACKGROUND OF THE INVENTION

One of the major concerns of the motor vehicle industry is to produce lighter weight, more energy and more cost efficient automobiles. Consequently, much work has been done to develop plastics with sufficient strength and durability to replace many of the metal components of motor vehicles, including structural support parts. A reinforced plastic part must possess structural strength and integrity equivalent to a metal component while simultaneously reducing its weight at equal, or preferably, lower cost. Therefore, development of high strength structural composites has been directed to upgrading molding products such as SMC, BMC and TMC.

As mentioned previously, these composites have other applications and have found utility in the commercial and domestic plumbing markets where one piece shower and/or bath installations are produced which offer construction labour and cost savings.

SMC is a composite material and usually comprises crosslinkable polymeric resin, most often unsaturated polyester resin; styrene monomer, plus catalyst; particulate filler, such as calcium carbonate; chopped glass fiber reinforcement; and various other additives in minor amounts, such as pigments and other modifiers.

The manufacture of SMC begins by laying the paste comprising all ingredients except the glass fibers, on a bottom carrier or release sheet, i.e., a film. The glass fibers are poured on top of the resin. More paste is poured over the glass fibers. A top carrier release sheet is laid down, and the edges of the top and bottom sheets are folded over to form a sandwich. The film and hence the composite is then kneaded to mix the glass fibers and the paste. The sandwich is then festooned (folded back and forth in a continuous fashion) into a bin and stored for up to about 14 days to cure or mature. Satisfactory results may be obtainable after as little as 2.5 days, but often more time is required. During this time the viscosity of the composite increases significantly (approximately ten fold).

At the end of the curing period, the carrier release films, top and bottom are stripped away, the solidified SMC is cut and put into a heated press. In roughly one minute or less, out comes a semi-finished product, such as an auto part, for example, an automobile hood.

TMC is produced by a different machine and process than that used for producing SMC. Although TMC is prepared as a continuous length of material, it is cut into slabs for curing and storage because it is thicker than SMC. SMC is usually 1" thick, but may range from ¼" to 3" in thickness. TMC may range from ½" to 4" in thickness. TMC is stronger because some of the fiberglass fibers may be positioned vertically, and more filler may be added. A most significant difference between SMC and TMC is that in making TMC, the glass fibers are mixed with the paste prior to being deposited on the carrier or release film, and thus no kneading of the composite sandwich is necessary when TMC is made into slabs. This therefore places different requirements on the carrier or release film as tear strength may not be as critical for carrier release film used to make TMC.

BMC is also a composite material of resins, fillers and reinforcements. Typically, it comprises 30% resins, 50% fillers and additives and 20% reinforcement, such as glass fiber. It may also contain catalysts. The high filler loadings can provide improved stiffness and fire retardness. BMC is manufactured by preparing a putty-like molding compound comprising the above-noted components in a "ready to mold" form. Molding pressures usually range from about 350 to 2000 psi at temperatures of between 250 and 350° F. BMC can be added into precise shapes with various types of inserts, the moldings can be extremely complex. One limitation of BMC is the loss of strength caused by degradation of glass fiber reinforcements during energy-intensive mixing.

BMC is primarily used as a replacement for cast metals. The actual physical characteristics of BMC are determined primarily by the choice of resin and desired end use. Possible end uses include: electrical grade; low shrink/general purpose; appliance/structural; low profile; automotive grade; and corrosion resistant. Major applications of BMC include: air conditioner components; pump housings; circuit breakers; computer and business equipment components; garbage disposal housings; motor parts; power tools; gear cases; electrical insulators; and circuit covers.

In selecting a carrier release film there are some basic requirements or properties that are preferably met for the film to be suitable. While styrene barrier, moisture barrier, and mechanical strength are relevant, most important are release from the paste composite, be it SMC, BMC, or TMC, and the cost of the release film.

RELEASE FROM THE SMC PASTE

The film must release cleanly from the molded product surface. If any of the film is left behind this will affect the final painted finish of the surface. The film must also not carry any of the paste as it is peeled away from the molded surface. This is generally considered to be one of the most important, if not the most important, property for a commercially useful carrier release film. Typically, this film property signals that the film will exhibit an adequate level of the majority of any of the other desirable properties for such films.

FILM PRICE

This property speaks for itself given that it is important to keep costs as low as possible and yet produce quality product. At the same time, since the film does not form part of the final product and is either thrown away or recycled, its cost is significant and efforts to keep it to a minimum are constant.

There have been a number of different types of films proposed for use as release films in the manufacture of molded composites. Examples include low density polyethylene (LDPE), high density polyethylene (HDPE), a laminate of HDPE/Nylon/HDPE, nylon, polyvinylidene chloride and cellophane.

In U.S. Pat. No. 4,444,829, which issued Apr. 24, 1984 to Bollen, Degrassi and Sacks, there is described a low crystallinity polyamide film comprising a blend of 90 to 70 wt. % of a polyamide having a crystallinity of less than 35% and 10 to 30 wt. % of a polyolefin component. The polyolefin component, which is a linear high molecular weight polymer of alpha-olefins, copolymer of alpha-olefin and vinyl acetate monomers or an alkyl acrylate, has a crystallinity of less than 50%.

In Sipos' Australian Accepted Specification No. 628105, published Sep. 10, 1992, there is claimed a film for use as a release film made from a blend comprising i) from 2 to 25 wt. % of a grafted terpolymer having two of the three monomers selected from the group consisting of $C_2$ to $C_{20}$ alpha-olefins, and wherein the grafted terpolymer is grafted with a grafting monomer selected from the group consisting of acrylic acid, methacrylic acid, maleic acid, fumaric acid, itaconic acid, crotonic acid, 5-norbornene-2,3 dicarboxylic acid, methyl-5-norbornene-2,3 dicarboxylic acid, maleic anhydride, dimethylmaleic anhydride, monosodium maleate, disodium maleate, acrylamide, itaconic anhydride, citraconic anhydride, maleimide, N-phenylmaleimide, diethyl fumarate, vinyl pyridines, vinyl silanes, 4-vinyl pyridine vinyltriethoxysilane and allyl alcohol, ii) from 5 to 25 wt. % of a non-grafted terpolymer having two of the three monomers selected from the group consisting of $C_2$ to $C_{20}$ alpha-olefins, iii) an aliphatic polyamide and iv) from 0 to 25 wt. % an alpha-olefin polymer selected from the group consisting of homopolymers of ethylene, homopolymers of propylene, homopolymers of butene-1, copolymers of ethylene and a $C_3$ to $C_{10}$ alpha-olefin, copolymers of ethylene and acrylic acid, copolymers of ethylene and methacrylic acid, copolymers of ethylene and vinyl acetate, and ionomeric polymers derived from copolymers of ethylene and acrylic acid or methacrylic acid; said alpha-olefin monomers being present in the grafted terpolymer and the non-grafted terpolymer in amounts of up to 80 wt. % of the terpolymers; the total content of the alpha-olefin polymer, the grafted terpolymer and the non-grafted terpolymer being equal to or less than 30 wt. % of the blend, and the balance of the blend being an aliphatic polyamide, the melt viscosities of said polyamide, terpolymer and grafted terpolymer being selected such that the blend is homogeneous:

In Sipos' Australian Accepted Specification No. 621956, published Mar. 26, 1992, there is claimed a release film made from a blend comprising from 5 to 25 wt. % of a $C_2$–$C_{20}$ alpha-olefin polymer grafted with an ethylenically unsaturated hydrocarbon with at least one functional group, and from 95 to 75 wt. % of an aliphatic polyamide, the melt viscosities of said polyamide and graft polyolefin being selected such that the blend is homogeneous.

Calcium stearate is known as a processing aid for the manufacture of resins and it is also known to be used as a metal mold release agent. However it has not been used as a release agent in release film used in the manufacture of molding composites.

While there are commercial products that are currently used as a carrier or release films in this area, there remains a need for a carrier or release film which meets the above requirements to a greater extent, particularly if those films offer cost advantages.

SUMMARY OF THE INVENTION

The invention of U.S. parent application Ser. No. 08/828,919 filed Mar. 28, 1998 claims a mold or release carrier film for use in the manufacture of molding compound composites formed from a blend of a film forming polyamide resin and at least one release agent material selected from the group consisting of N,N' ethylene bis amides of the formula:

wherein $R_1$ is an aliphatic hydrocarbon chain of about 14 to about 42 carbon atoms, and $R_2$ is a hydrogen atom or an aliphatic hydrocarbon chain of about 14 to about 42 carbon atoms.

The present invention provides a film for adhering to a molding compound paste composite during its manufacture, said film being formed from a blend of a film forming polyamide resin and at least one release agent material selected from the group consisting of N, N' ethylene bis amides of the formula:

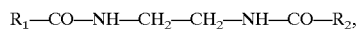

wherein $R_1$ is an aliphatic hydrocarbon chain of about 14 to about 42 carbon atoms, and $R_2$ is a hydrogen atom or an aliphatic hydrocarbon chain of about 14 to about 42 carbon atoms;
calcium stearate;
a mixture of calcium stearate and silicone;
a mixture of calcium stearate and polytetrafluoroethylene;
polypropylene;
maleic anhydride modified polypropylene;
waxes;
fluoroelastomers;
silicones;
molybdenum disulphide; and
boron nitride;
N, N' ethylene bis stearamide and polytetrafluoroethylene;
N, N' ethylene bis stearamide and silicone;
N, N' ethylene bis stearamide and graphite;
N, N' ethylene bis stearamide and polypropylene;
N, N' ethylene bis stearamide and molybdenum disulphide;
waxes and polytetrafluoroethylene;
waxes and silicone;
polytetrafluoroethylene and silicone;
polytetrafluoroethylene and maleic anhydride modified polytetrafluoroethylene;
silicone and graphite;
silicone and maleic anhydride modified polytetrafluoroethylene;
calcium stearate and molybdenum disulphide;
calcium stearate and boron nitride;
calcium stearate and polytetrafluoroethylene;
calcium stearate and graphite;
waxes and maleic anhydride modified polytetrafluoroethylene;
polytetrafluoroethylene and graphite;
polytetrafluoroethylene, silicone, graphite and molybdenum disulphide or boron nitride; and
molybdenum disulphide and boron nitride
with the proviso that any modified polypropylene present does not exceed 3% by weight and wherein the release agent material is present in an amount such that after the paste composite is formed, substantially all of the film can be removed from the surface of the composite.

In another aspect, the invention provides a molded composite having a mold release or carrier film adhered thereto, as described above.

This class of polyamide/amide films and their method of manufacture are disclosed in U.S. Pat. No. 4,490,324 issued Dec. 25, 1984 to Mollison, the disclosure of which is hereby incorporated by reference. The amide is preferably present in the blend in an amount that will permit removal of substantially all of the film from the paste. In the referenced patent, the amide may comprise from about 0.05 to about 1.0% by weight of the blend. Preferably, the amount used in the present blend is sufficient to permit substantially all of the film to be removed from the composite. It may range from about 0.05 to about 10% by weight, more preferably, the amount is from about 1.0% to about 3.0%. Most preferred is about 1.5% by weight of the blend.

In another preferred aspect, the invention provides a mold or release carrier film for use in the manufacture of molding compound composites formed from a blend of a film forming polyamide resin and a material comprising either calcium stearate or a mixture of calcium stearate with silicone or polytetrafluoroethylene.

In another aspect, the invention provides a molded composite having a mold release or carrier film adhered thereto, wherein the film is formed from a blend of a film forming polyamide resin and a material comprising either calcium stearate or a mixture of calcium stearate with silicone or polytetrafluoroethylene.

The calcium stearate preferably may be present in the blend in an amount in the range of from about 0.01 to about 5% by weight of the total blend composition, more preferably from about 0.1 to about 2% by weight, and most preferably, the amount may be about 0.8 to about 1.2% by weight.

When the calcium stearate is used with polytetrafluoroethylene or silicone, the calcium stearate may preferably range from about 0.01 to about 5% by weight, while the polytetrafluoroethylene may preferably range from about 0.01 to about 5% by weight. The silicone when combined with the calcium stearate may be present preferably in the range of from about 0.01 to about 5% by weight, with the calcium stearate preferably being present in an amount within that range also. The narrower ranges for calcium stearate also apply to the silicone and polytetrafluoroethylene.

It is also possible to characterize the amount of calcium stearate as parts per million of calcium as determined by Neutron Activation Analysis (NAA), in which case the above ranges would be preferably from about 6.5 ppm to about 3300 ppm, more preferably from about 66 ppm to about 1300 ppm, and most preferably from about 530 ppm to about 790 ppm.

Examples of the release agent for the polyamide resin are:
1% calcium stearate;
1% calcium stearate and 2.5% polytetrafluoroethylene; and
1% calcium stearate and 2% silicone.

The calcium stearate may be selected from any forms that are commercially available in such a form for incorporation with the polyamide. One example of a suitable form is that sold by The Norac Company, Inc. under the trade-mark COAD 10B which is available in powder and a lower dusting granular form. It may be in the form of a powder, granules, beads, flakes or any other suitable form.

The polytetrafluoroethylene which may be used may also be any commerically available form that is suitable for incorporation in the polyamide and the other ingredients present in the blend. One example of a suitable material is that sold by DuPont under the trade-mark TEFLON. TEFLON MP1300 and TEFLON MP1150 have been used successfully.

The silicone may also be selected from any commercially available form that is suitable for incorporation with the polyamide and other ingredients present in the blend. One example of a suitable material is that sold by Dow Corning Canada Inc. under the designation DOW CORNING® MB50-011. Typically a Master Batch comprising 50% Nylon 6 and 50% silicone is used. Dow Corning® provides pelletized micro-dispersions of a special ultra-high-molecular-weight silicone polymer in various thermoplastic carrier resins at loadings of up to 50 percent.

Dyes and/or pigments may be incorporated into the blend to facilitate seeing the film once applied to the composite. This helps with removal. Any dye or pigment which may readily be incorporated into the other blend components may be used. BASF supplies a dye under the trade name PALAMID Yellow 15-605. This consists of a 75% Nylon 6 base and 25% of a colour load. BASF also supplies a suitable pigment under the designation 21-0705. These have been found to be suitable for use in the resin blend.

In most preferred forms of the invention, the individual release agents may be used in combination in the amounts set out below.

TABLE I

| Release Agent | Preferred Amount % by weight | Most Preferred % by weight |
|---|---|---|
| MZ109D maleic anhydride modified polypropylene | 2–3 | 2.75 |
| Crodamide ® EBS Beads (fatty acid amide) or Kemamide ® W40 | 1–2 | 1.5 |
| Epolene ® G-3003 wax maleic anhydride modified polypropylene | 2–3 | 2.75 |
| Luwax ® OP Flakes montanic acid ester waxes | 0.5–1.5 | 1.0 |
| Dow Corning Silicones | 1.5–2.5 | 2.0 |
| Calcium Stearate | 0.8–1.2 | 1.0 |
| Viton ® (fluoroelastomers) | 0.02–0.04 | 0.02 |
| Teflon ® (polytetrafluoroethylene) | 1.2–2.0 | 2.0 |

It is possible to use many different combinations of these release agent materials and the examples herein are merely representative of the various combinations possible.

In most instances a dye is added to the resin mixture in order for the film to be visible. Often this dye may be N6,6 yellow dye in a preferred amount of about 0.2 to about 0.3% by weight, more preferably about 0.2% by weight.

In the event these release agents are used individually, the preferred and most preferred ranges are as follows:

TABLE II

| Release Agent | Preferred Range Claimed in % by weight | Most Preferred Range in % by weight |
|---|---|---|
| N6,6 Crodamide ® EBS Beads or Kemamide ® W-40 (fatty acid amide) | 0.01–5.0 | 0.5–2.0 |
| Calcium Stearate | 0.01–5.0 | 0.5–2.0 |
| Dow Corning Silicone Master Batch | 0.01–5.0 | 0.5–3.0 |
| Viton ® (fluoroelastomers) | 0.01–4.0 | 0.01–2.0 |
| N6,6 Yellow Dye | 0.01–2.0 | 0.1–1 |

TABLE II-continued

| Release Agent | Preferred Range Claimed in % by weight | Most Preferred Range in % by weight |
|---|---|---|
| Teflon ® (polytetrafluroethylene) | 0.01–5.0 | 0.5–3.0 |
| Polypropylene | 0.01–3.0 | 1.0–3.0 |
| Luwax ® OP Flakes BASF montanic ester waxes | 0.01–5.0 | 0.5–2.0 |
| Epolene ® G-3003 Wax (chemically modified polypropylene 99.0 wt. %, 4.0 wt. % maleic anhydride) | 0.01–3.0 | 0.5–2.0 |
| Fusabond ® MZ109D DuPont maleic modified polypropylene | 0.1–3.0 | 1.0–3.0 |

It s ould be noted that the commercial products mentioned above are examples of commercially acceptable materials that fall within the general classes of the various types of release agents.

The film blend may be made and then melt extruded into the film as described in the above-referenced Mollison patent. However, the blend is preferably made in one of two ways. The first method involves the addition of the amide compound in the exact amount required for the formulation. The second method comprises combining pure polyamide resin with a blend of the polyamide resin and the amide or other additives. In such instance, the amount of the blend combined with the pure polyamide is adjusted to provide the desired amount of amide in the final blend. In the Mollison process, the film is extruded and cast, and then it is heated to improve the slip characteristics. Typically this technique is used when the amount of amide is at the low end of the preferred range. Generally, at the most preferred levels of amide used in the film blend of the present invention, heating after casting and before storage is not required. However, if an oriented film is used, heating would be used. It is also believed that the use of an oriented film would permit down gauging the film thickness, and this could produce additional cost savings depending on the orienting cost. If the film is re-heated, it is generally heated from between about 80° C. to about 140° C.

The polyamide used may be selected from all film forming, melt extrudable Nylon resins such as Nylon 6,6, Nylon 6, blends of Nylon 6,6 and Nylon 6 and copolymers of hexamethylene diamine adipate and γ-caprolactam. Copolymers containing up to 25% by weight γ-caprolactam may be used, as may copolymers of about 90% by weight hexamethylene diamine-adipate and about 10% by weight of γ-caprolactum.

In one of its most preferred forms, the film blend comprises Nylon 6,6 and N,N' ethylene-bis-stearamide.

The molded composites are preferably selected from SMC, BMC and THC. Other types of composites may be manufactured using this film given its properties and these will be apparent to the person skilled in the art. The formulations for such pastes are well known in the art, but in the following Table I there are set out typical generic formulations used for BMC, SMC and TMC. These represent formulations used commercially for the manufacture of such composites. Many other suitable formulations may be used and the examples here are meant to serve as a guide to the person skilled in the art.

In the subsequent Table III, there are set out typical aspects of the paste mix processes used to make BMC, SMC and TMC composites. All of the above formulations and processes may be used to produce the composites of the present invention. Again, other methods in the art may be used to make these composites, and these examples are meant to serve as a guide to the person skilled in the art.

TABLE III

FORMULATIONS-BMC vs. SMC vs. TMC

| BMC (Bulk Molding Compound) | PARTS | SMC (Sheet Moulding Compound) A" SIDE | PARTS | TMC (Thick Molding Compound) | PARTS |
|---|---|---|---|---|---|
| Polyester Resin* | 75 | Polyester Resin | 65 | Polyester Resin | 65 |
| Thermoplastic* | 25 | Thermoplastic | 35 | Thermoplastic | 35 |
| Hold Release* | 4.0 | Hold Release | 3.5 | Hold Release | 3.5 |
| Catalyst* | 1.5 | Catalyst | 1.5 | Catalyst | 1.5 |
| Filler* | 300 | Filler | 200 | Filler | 225 |
| Glass Fibers-¼"* | 10–20 Wgt. % | Glass Fibers-1" Added at Machine | 25–30 Wgt. % | Glass Fibers ½"–1" Added at Machine | 10–20 Wgt. % |
| Thickening Agent* (Optional) | 1 | "B" Side (Thickening Agent Dispersion) | 18 | Thickening Agent (Powder) | 1 |

TABLE IV

BMC vs. SMC vs. TMC MIX PROCESSES

| | BMC | SMC | TMC |
|---|---|---|---|
| PASTE MIX PROCESS: | Batch | Batch and/or Continuous In-Line | Batch |
| MIXER TYPE | Low Intensity (Plough Type) | High Intensity (Cowles Dissolver) or Low Intensity (Horizontal Plough or Double Planetary) | High Intensity (Cowles Dissolver) |
| GLASS LENGTH | ¼"–½" | 1" | ½"–1" |
| GLASS % | 10–20 | 20–60 | 12–25 |

TABLE IV-continued

BMC vs. SMC vs. TMC MIX PROCESSES

| | BMC | SMC | TMC |
|---|---|---|---|
| PASTE VISCOSITIES BROOKFIELD (CPS) | 200,00–4 mm | 10,000–60,000 | 10,000–100,000 |

In another aspect, the invention provides an improved process for producing sheet molding composites which comprises:
   (a) casting a layer of heat-curable thermosetting resin, in fluid form, onto a continuously advancing polymeric film;
   (b) introducing reinforcing material onto the advancing fluid layer;
   (c) laying a polymeric film on the top surface of said reinforced fluid layer thereby forming a sandwich composite;
   (d) advancing said sandwich composite through a series of kneading and compaction rolls; and
   (e) winding the sandwiched composite into a roll for partial curing;
the improvement comprising using as the polymeric carrier or mold release film, a blend of a film-forming polyamide resin and amide in sufficient quantity to permit substantially complete release of the film from the composite.

In another aspect, the invention provides an improved process for making thick molding composites, comprising
   (a) introducing reinforcing material into a heat-curable thermosetting resin, in fluid form and mixing same until the material is mixed and wetted;
   (b) casting a layer of said mixture onto a continuously advancing polymeric film;
   (c) laying a polymeric film on the top surface of said reinforcing material-resin layer to form a sandwich composite;
   (d) advancing the sandwich composite through at least one compaction roll;
   (e) cutting the continuous lengths of the sandwich composite into lengths for partial curing;
the improvement comprising using as the polymeric carrier or mold release film, a film made from a blend of a film-forming polyamide resin and an amide in sufficient quantity of a material to permit substantially complete release of the film, from the molded composite.

In another aspect, the invention provides an improved process for producing sheet molding composites which comprises:
   (a) casting a layer of heat-curable thermosetting resin, in fluid form, onto a continuously advancing polymeric film;
   (b) introducing reinforcing material onto the advancing fluid layer;
   (c) laying a polymeric film on the top surface of said reinforced fluid layer thereby forming a sandwich composite;
   (d) advancing said sandwich composite through a series of kneading and compaction rolls; and
   (e) winding the sandwiched composite into a roll for partial curing;
the improvement comprising using as the polymeric carrier or mold release film, a blend of a film-forming polyamide resin and, in sufficient quantity to permit substantially complete release of the film from the composite, a material comprising either calcium stearate or a mixture of calcium stearate with silicone or polytetrafluoroethylene.

In another aspect, the invention provides an improved process for making thick molding composites, comprising
   (a) introducing reinforcing material into a heat-curable thermosetting resin, in fluid form and mixing same until the material is mixed and wetted;
   (b) casting a layer of said mixture onto a continuously advancing polymeric film;
   (c) laying a polymeric film on the top surface of said reinforcing material-resin layer to form a sandwich composite;
   (d) advancing the sandwich composite through at least one compaction roll;
   (e) cutting the continuous lengths of the sandwich composite into lengths for partial curing;
the improvement comprising using as the polymeric carrier or mold release film, a film made from a blend of a film-forming polyamide resin and a sufficient quantity of a material to permit substantially complete release of the film from the molded composite, and selected from either calcium stearate or a mixture of calcium stearate with silicone or polytetrafluoroethylene.

The film of this invention offers excellent release properties at a lower cost than comparable films in the marketplace. The amide component also appears to act in an antistatic manner which therefore eliminates the need for the addition of antistatic material to the film blend.

BRIEF DESCRIPTION OF THE DRAWINGS

In the accompanying drawings which are used to illustrate but not limit the present invention.

DESCRIPTION OF THE PREFERRED EMBODIMENT

The film of the present invention can be prepared by thoroughly blending together the main components and preferably a minor amount of a dye which allows the film to be seen easily once applied to the paste, and hence readily removed therefrom, followed by hot melt extrusion.

The film obtained from the present blend has a high gloss which makes it quite visible on a coloured paste. To improve the ability to see it, a pigment may be added. A preferred pigment is PALAMIDE YELLOW which is made by BASF. Typically it can be used in an amount of from about 0.1 to about 0.5% by wt. based on the total weight of the blend, although preferably it comprises about 0.2% of the blend.

Representative examples of suitable blending devices for forming the blend include drum tumblers, Banbury mixers, twin screw extruders, and heated roll mills. The temperature of the blending step is usually about ambient temperature. The blend is then charged into a hot melt extruder equipped with a film—forming die, and the resulting film having a thickness of up to 2 mils, preferably from about 1.0 mil is cast, cooled and may be rolled for storage.

Figure 1:
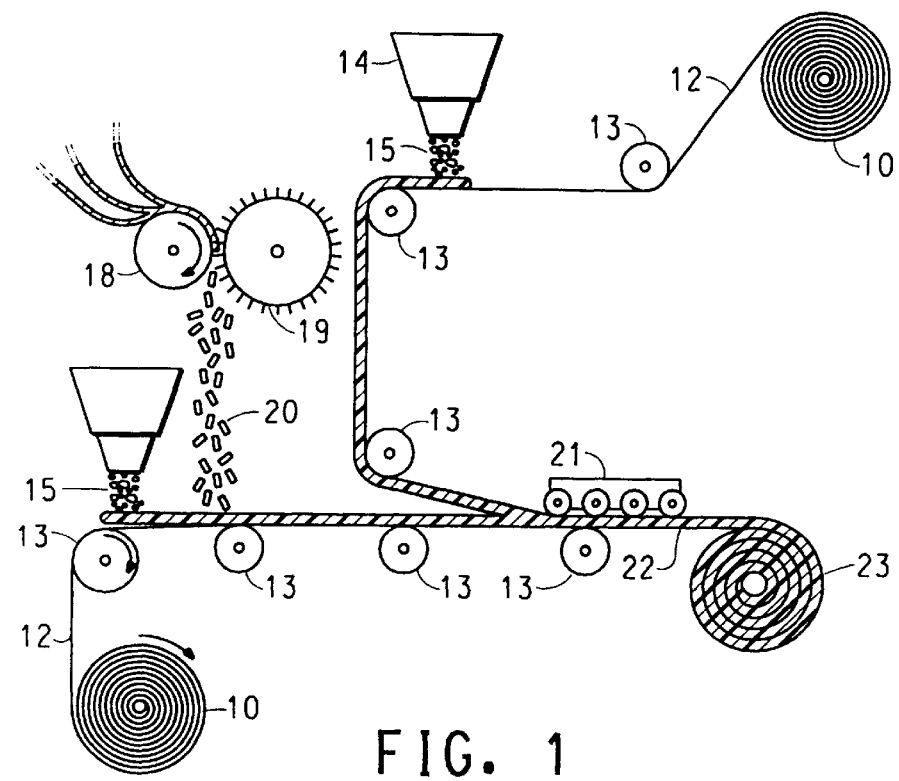
FIG. 1 is a schematic illustration of a conventional apparatus and process used for the manufacture of SMC.

A general description of the process for producing SMC is obtained by referring to FIG. 1. Storage rolls 10 release stored film 12 onto carrier/conveyor rolls 13 which transport the subject film 12 throughout the sandwich-forming process. Dispensers 14 deposit fluid SMC resin/filler paste 15 onto film 12 forming resin filler layer 16. In FIG. 1, to the bottom layer 16, glass reinforcement is added whereby continuous strand roving 17 is guided and advanced by roller 18 positioned in relation to cutter 19 such that the roving strand 17 is chopped into smaller size reinforcing pieces 20, of about 1' in length which are then deposited onto layer 16 of the advancing coated film. The layered film is collected on mandrel 23 to form a roll of SMC sandwich composite.

The above-described embodiment is a conventional method of producing SMC sandwich composite, in which the carrier film has been preformed in a separate step, stored, and is then removed and used in the process. An alternate process would be where the film is produced in two different film extrusion/casting operations and utilized directly to make SMC sandwich composite.

Another example of a typical SMC compound used to produce automotive parts generally contains the following components; resin—formed from (1) unsaturated acids or acid anhydrides such as fumaric acid and/or maleic anhydride combined with (2) saturated acids or acid anhydrides such as phthalic anhydride and/or isophthalic acid or adipic acid reacted with (3) glycols or diglycols such as ethylene glycol, propylene glycol, diethylene glycol or dipropylene glycol; crosslinking monomer such as styrene or vinyl toluene; catalyst—peroxides or per acids such as t-butyl per benzoate; catalyst activator—metallic soaps such as zinc stearate; mineral extenders or filler—e.g. calcium carbonate; pigment—e.g. iron oxide; and thickening agent—e.g. magnesium hydroxide. An example of the amounts of these components is:

| | |
|---|---|
| resin and monomer | 100 parts |
| catalyst | 1 part |
| catalyst activator | 3 parts |
| filler | 150 parts |
| pigment | 3 parts |
| thickening agent | 3.8 parts |

To this resin mixture, chopped glass fiber, of about 1 to 2 inches in size, and/or other fibrous reinforcements such as carbon or metal fiber are added.

Figure 2:
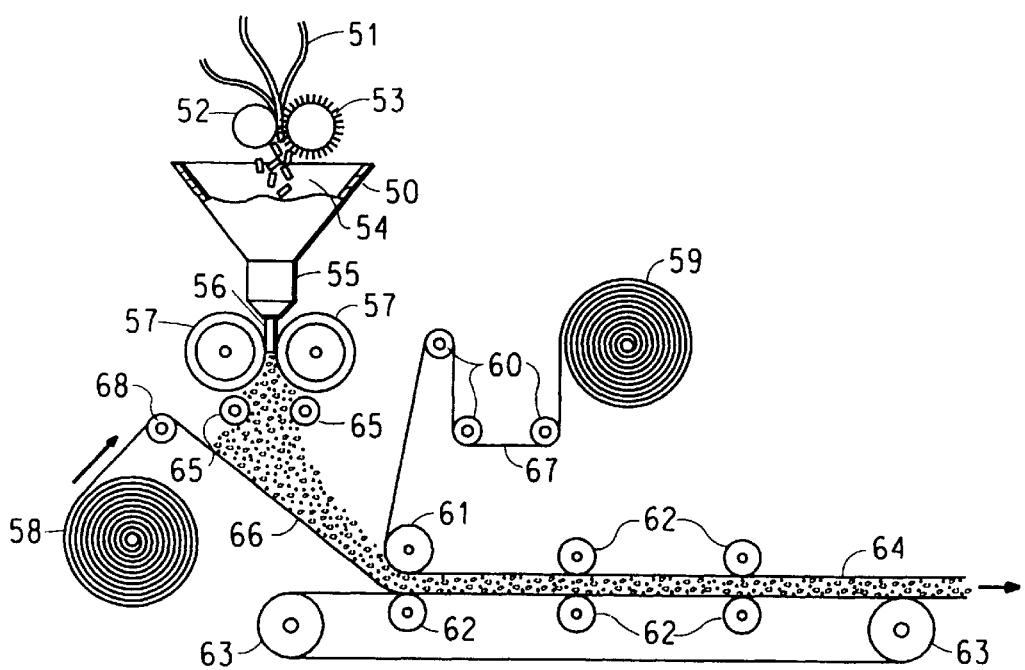
FIG. 2 is a schematic illustration of a conventional apparatus and process used for the manufacture of TMC.

Referring now to FIG. 2 of the drawings, there is shown a schematic drawing of a TMC process. Strands of fibreglass 51 are fled to a cutting roller assembly 52 and 53, and the chopped fibreglass 54 is fed into a kettle 50 which empties between a pair of rollers 57 to which a feed of resin compound (not shown) is combined with the chopped glass at 56. Rollers 65 are wiping rollers for rollers 57 and these help direct the mixture of resin and glass onto a lower carrier film 66 which feeds off a supply roll 58 and up onto a feeder roller 68. A set of lower feed rollers 63 and 62 and a belt 69 receive and feed the lower carrier film 66. Nip roller 61 is in position to feed an upper carrier film 67 over the top of the resin and glass mixture and to start compressing the mixture between the upper and lower films 67 and 66, respectively. Compaction rollers 62, compress the long sandwich composite of thick molding compound which is then fed off to be cut into suitable lengths for storage and shipping.

The following examples are illustrative of the best mode of carrying out the invention as contemplated and should not be construed as being limitations on the scope or spirit of the instant invention.

EXAMPLES

The following resin formulations were prepared in accordance with the present invention.

TABLE V

| EXAMPLE No. | COMPONENT | % BY WEIGHT |
|---|---|---|
| 1. | Nylon 6,6 | 97.8 |
| | Calcium Stearate | 1.0 |
| | MB50-011 (Dow Corning) | 1.0 |
| | Nylon 6 Yellow Dye | 0.2 |
| 2. | Nylon 6,6 | 95.8 |
| | Calcium Stearate | 2.0 |
| | MB50-011 | 2.0 |
| | Nylon 6 Yellow Dye | 0.2 |
| 3. | Nylon 6,6 | 96.8 |
| | Calcium Stearate | 1.0 |
| | MB50-011 | 2.0 |
| | Nylon 6 Yellow Dye | 0.2 |
| 4. | Nylon 6,6 | 98.0 |
| | Calcium Stearate | 0.8 |
| | MB50-011 | 1.0 |
| | Nylon 6 Yellow Dye | 0.2 |
| 5. | Nylon 6,6 | 97.0 |
| | Calcium Stearate | 0.8 |
| | MB50-011 | 2.0 |
| | Nylon 6 Yellow Dye | 0.2 |
| 6. | Nylon 6,6 | 97.8 |
| | Calcium Stearate | 2.0 |
| | Nylon 6 Yellow Dye | 0.2 |
| 7. | Nylon 6,6 | 98.8 |
| | Calcium Stearate | 1.0 |
| | Nylon 6 Yellow Dye | 0.2 |
| 8. | Nylon 6,6 | 98.44 |
| | Calcium Stearate | 1.36 |
| | Nylon 6 Yellow Dye | 0.2 |
| 9. | Nylon 6,6 | 96.3 |
| | Calcium Stearate | 1.0 |
| | TEFLON | 2.5 |
| | Nylon 6 Yellow Dye | 0.2 |
| 10. | Nylon 6,6 | 94.0 |
| | Calcium Stearate | 0.8 |
| | TEFLON | 5.0 |
| | Nylon 6 Yellow Dye | 0.2 |
| 11. | Nylon 6,6 | 96.5 |
| | Calcium Stearate | 0.8 |
| | TEFLON | 2.5 |
| | Nylon 6 Yellow Dye | 0.2 |
| 12. | Nylon 6,6 | 100 |

PROCEDURE FOR SHEET MOULDING COMPOUND RELEASE TEST INTRODUCTION:

This test simulates the stripping of film from partially cured SMC as in a commercial process. Small strips of film are laid on SMC paste for a set duration. At the end of a set duration, the force required to remove the film from the paste is measured and recorded. The force provides a quantitative measure of the relative ease of different films for release from SMC paste.

DESCRIPTION OF PROCEDURE

The first item needed is a metal tray with 0.5 inch sides. The tray can be of any convenient size and made of an inexpensive material such as aluminum. The tray is lined with a polyethylene film, typically 1.5 mil thick or thereabouts. At the end of the test, once the paste is partially cured, the liner and the paste can be easily removed from the tray and the tray reused.

The tray is filled with prepared or mixed paste to about ⅜ inch deep. The paste should be fresh to replicate as best as possible, the characteristics that it would have in actual production on a commercial line. All ingredients, except glass fibers, should be present in the paste in the ratio that is used on the commercial line. The paste should be made up according to the mixing instructions provided by the manufacturer. Level the paste by agitating the tray. In pouring the paste, ensure that no air bubbles are trapped.

On top of the paste, lay a Nylon film that has had 1 inch by 6 inch openings cut into it. The openings are best cut with a NAEF type die in order to achieve the same dimensions for each opening. Typically, the openings are cut into columns and are equally spaced. The film should fit the tray tightly to prevent loss of styrene from the paste and premature hardening. The film thickness is typically 1.5 mils.

From the films to be tested for release, at least two specimens of size 1.5 inches wide by 8 inches long are cut. The specimens are laid on the paste that is presented by the openings in the Nylon film. The specimens are placed on the paste and then lightly pressed to ensure that there is complete contact between the paste and the corresponding area of the specimen. Any air should be removed. The intent is to ensure that the surface of the specimen is well wetted with paste throughout the 1 inch by 6 inch opening but nowhere else.

The tray and film specimens sits for a duration of time that is decided by the analyst. Usually it sits for the same length of time that is used in the commercial process to cure the past before stripping of the film. Typically, this can be anywhere from 2 to 14 days. During this time, the tray should reside in a fume hood at room temperature (23° C.). The fume hood is needed to carry away any fugitive emissions of styrene. Variations in temperature could bias the procedure since the paste will not cure properly if it sees temperature above or below room temperature.

The specimens are removed from the paste using a pneumatic or cross arm piston. Attached to the free end of the piston or cross arm is a calibrated instrument capable of measuring force. The preferred instrument is provided by N. Zivy & Co. (Basle, Switzerland) and is commonly called the "Zivy meter" or Instron Tensile Tester. The pneumatic piston or cross arm is lined up with the centreline of the specimen. The specimen is manually pulled back to expose ¼ inch to ½ inch of paste so as to initiate the stripping of the film. The leading edge of the specimen is clamped with a ¾ inch wide Binder Clip (or sometimes called a fold back clip). The Binder Clip is attached to the arm of the Zivy meter by a string. The piston or cross arm is located far enough away so that the string shows no slack but neither is it taut. The piston or cross arm is also positioned vertically so that the specimen will be pulled through a tight hairpin turn of 180 back upon itself or alternatively at 90° to the paste. The piston or cross arm is actuated and the reading on the Zivy meter is recorded. Usually, the meter "spikes" at the start of the pull but quickly settles to a constant value. This plateau is recorded and is deemed to be the release tension of the specimen. In cases where the reading is variable, an average is taken. This most often occurs when the release of the film from the paste is poor. The air pressure to the piston is set so that it retracts at the rate of 1.8 inches per second.

Once all the specimens are pulled, the amount of residue on surface of each specimen is qualitatively ranked and recorded.

This test is most efficacious when a number of control films is included in the test. The control films are known to work satisfactorily in the commercial process and provide a calibration between this test and functionality in the commercial line.

In the following Table VI, there are the results of paste release tests conducted in respect of the resins set out in Table V as well as Nylon 6,6 on its own and a product that has been made by DuPont Canada for use as a mold release film. These results show that the film of the present invention performs at least as well as the DuPont Canada product which was perceived to have good commercial utility.

TABLE VI

| EXAMPLE NO. | FILM DESCRIPTION | RELEASE TENSION (3 DAY PASTE TEST) (GRAMS) |
|---|---|---|
| 1. | Nylon 6,6 and 1.0% calcium stearate and 1.0% Dow Corning MB50-011 and 0.2% Nylon 6 Yellow Dye | 8,7,15 |
| 2. | Nylon 6,6 and 2.0% calcium stearate and 2.0% Dow Corning MB50-011 and 0.2% Nylon 6 Yellow Dye | 10 |
| 3. | Nylon 6,6 and 1.0% calcium stearate and 2.0% Dow Corning MB50-011 and 0.2% Nylon 6 Yellow Dye | 5,5 |
| 4. | Nylon 6,6 and 0.8% calcium stearate and 1.0% Dow Corning MB50-011 and 0.2% Nylon 6 Yellow Dye | 12 |
| 5. | Nylon 6,6 and 0.8% calcium stearate and 2.0% Dow Corning MB50-011 and 0.2% Nylon 6 Yellow Dye | 13,15 |
| 6. | Nylon 6,6 and 2.0% calcium stearate 0.2% Nylon 6 Yellow Dye | 50* |
| 7. | Nylon 6,6 and 1.0% calcium stearate 0.2% Nylon 6 Yellow Dye | 15,10,15 |
| 8. | Nylon 6,6 and 1.36% calcium stearate 0.2% Nylon 6 Yellow Dye | 7 |
| 9. | Nylon 6,6 and 1.0% calcium stearate and 2.5% TEFLON and 0.2% Nylon 6 Yellow Dye | 15,8,15 |

TABLE VI-continued

| EXAMPLE NO. | FILM DESCRIPTION | RELEASE TENSION (3 DAY PASTE TEST) (GRAMS) |
|---|---|---|
| 10. | Nylon 6,6 and 0.8% calcium stearate and 5.0% TEFLON and 0.2% Nylon 6 Yellow Dye | 8 |
| 11. | Nylon 6,6 and 0.8% calcium stearate and 2.5% TEFLON and 0.2% Nylon 6 Yellow Dye | 12,10,7 |
| 12. (control) | Nylon 6,6 | 75,30,45 |
| 13. DuPont Canada Commercial Resin | Grafted polypropylene-polyamide resin made in accordance with SIPO'S Australian Publication No. 621956 | 5,5,5,4,3 |

* Feeding problems at extruder. Sample contained possibly no calcium stearate.

The following examples are illustrative of the invention as contemplated and should not be construed as being limitations on the scope or spirit of the instant invention.

EXAMPLES

In the following examples, comparisons were made among the release film of the present invention and two other release films that have been used commercially. In each instance, the property measured is Release Tension.

TABLE VII

| Example | Film Designation | Film Description | Release Tension (5 day paste test) (grams) |
|---|---|---|---|
| 1 | DUPONT S-701 | Grafted polypropylene-polyamide resin made in accordance with SIPOS' Australian Publication No. 621956 | Average (2 films) = 16 Range = 10–22 |
| 2 | Conventional Commercial Product | Nylon 6 and EVA (ethylene-vinyl acetate) | Average (2 films) = 27 Range = 12–40 |
| 3 | Film of Present Invention | Nylon 6.6 and 2% Kemamide W-40* | Average (2 films) = 14 Range - 10–18 |

TABLE IX

| Eg. | Film Designation | Film Description | Release Tension (grams) (2 day paste test) | Release Tension (grams) (5 day paste test) |
|---|---|---|---|---|
| 1 | DUPONT S-701 | (see previous description) | 11, 20 (2 film strips tested) | 17, 20 (2 film strips tested) |
| 2 | Conventional Commercial Product | Nylon 6 and EVA (ethylene vinyl acetate blend) | 10, 12 (2 film strips tested) | 19, 20 (2 film strips tested) |
| 3 | DUPONT EN707 (film of invention) | Nylon 6.6 and 1.0% Kemamide W-40 | 21, 16, 25 (3 film strips tested) | 21, 22, 43* (3 film strips tested) |
| 4 | DUPONT EN706 (film of invention) | Nylon 6.6 and 1.5% Kemamide W-40 | 20, 20, 10 (3 film strips tested) | 20, 22, 20 (3 film strips tested) |

*Film specimen when laid on paste developed a deep crease that impeded removal during testing.

METHOD

The test method is set out previously. The Kemamide containing films of the present invention contained BASF blue dye at the nominal level of about 0.25% by weight. The paste upon which these films were tested is a typical commercially available paste formulation used to make SMC composites.

DISCUSSION

The release tension results are consistent for the two tests conducted as set out in Tables VIII and IX. The DUPONT S-701 film performed consistently in each test. While the release tension for the conventional commercial product is lower in Table IX, the range is not dissimilar to that observed in the test of Table VIII. The films of the present invention provided consistent results.

It should be understood that the detailed description and specific examples which indicate the presently preferred embodiments of the invention are given by way of illustration only since various changes and modifications within the spirit and scope of the appended claims will become apparent to those of ordinary skill in the art upon review of the above description.

The following is a description of the Hand Sample Release Tests, the results for which appear in the preceeding table.

Hand Sample Release Test Procedure
 a) cut a 12"×12" sample of film and fold it in half
 b) lay a thinner layer of paste on one third of the film starting at the fold line
 c) fold the film over the paste to create a sandwich
 d) fold the free edges under the sample
 e) cure the paste and film sandwich for 2–3 days
 f) unfold the edges of the film
 g) pull back the film on the top side of the paste
 h) rate the sample subjectively against a control sample The control sample, Example 10 is assigned a release tension value of 10. Any film that displays a tension of less than 10 performs well.

In the following Table X there are examples of a number of film formulations which illustrate combinations of release agents in accordance with the present invention.

TABLE X

| Example No. | Film Description and Percentage by Weight of Additive | Instron Test Release Tension (g) | | Hand Sample Release Test | |
|---|---|---|---|---|---|
| | | | Residue | Release | Residue |
| 1. | N6,6 (95.78%) MZ109D (2.5%) | 5, 8 7.5, 7 | less less | 10, 8 7, 11 | less less |

TABLE X-continued

| Example No. | Film Description and Percentage by Weight of Additive | Instron Test Release Tension (g) | Residue | Hand Sample Release Test Release | Residue |
|---|---|---|---|---|---|
| | Crodamide ® EBS Beads (1.5%) N6 Yellow Dye (0.2%) Viton ® (0.02%) | 8 | same | 12 | more |
| 2. | N6,6 (95.53%) | 6 | less | 12 | less |
| | MZ109D (2.75%) | 5 | less | 11 | less |
| | Crodamide ® EBS Beads (1.5%) | 12 | same | 11 | slightly more |
| | N6,6 Yellow Dye (0.2%) Viton ® (0.02%) | | | | |
| 3. | N6,6 (95.53%) | 7 | significantly less | 8 | less |
| | Epolene ® G-3003 Wax (2.75%) | 7 | less | 9 | less |
| | Crodamide ® EBS Beads (1.5%) N6,6 Yellow Dye (0.2%) Viton ® (0.02%) | | | | |
| 4. | N6,6 (96.03%) | 5 | same | 8 | slightly more |
| | MZ109D (2.75%) | 6 | same | 9 | more |
| | Luwax OP ® Flakes (1.0%) | 2 | same | 7 | same |
| | N6,6 Yellow Dye (0.2%) Viton ® (0.02%) | | | | |
| 5. | N6,6 (96.03%) | 5 | slightly more | 8 | more |
| | Epolene ® G-3003 Wax (2.75%) | 6 | same | 9 | more |
| | Luxax OP ® Flakes (1.0%) | 2, 2 | same | 8 | same |
| | N6,6 Yellow Dye (0.2%) Viton ® (0.02%) | | | | |
| 6. | N6,6 (94.03%) Dow Corning MB50-011 | 6 | more | 8 | more slightly more |
| | Silicone (2.0%) | 6 | same | 10 | |
| | MZ109D (2.75%) | 8 | same | 12 | slightly more |
| | Luwax OP ® Flakes (1.0%) N6,6 Yellow Dye (0.2%) Viton ® (0.02%) | | | | |
| 7. | N6,6 (94.03%) Dow Corning MB50-011 | 5 | same | 8 | slightly more |
| | Silicone (2.0%) Epolene ® | 6.5 | same | 9 | more slightly more |
| | G-3003 Wax (2.75%) | 5 | same | 7 | |
| | Luwax OP ® Flakes (1.0%) N6,6 Yellow Dye (0.2%) Viton ® (0.02%) | | | | |
| 8. | N6,6 (95.87%) Dow Corning | 8 | slightly more | 8 | more |
| | EPA-25 (1.66%) | 4.5 | same | 11 | more |
| | MZ109D (1.25%) Luwax OP ® Flakes (1.0%) N6,6 Yellow Dye (0.2%) Viton ® (0.02%) | | | | |
| 9. | N6,6 (95.62%) Dow Corning | 10 | less | 8 | same |
| | EPA-25 (1.66%) Epolene ® | 5.5 | same | 12 | more |
| | G-3003 Wax (1.5%) Luwax OP ® Flakes (1.0%) N6,6 Yellow Dye (0.2%) Viton ® (0.02%) | | | | |
| 10. (control sample) | Grafted polypropylene polyamide resin made in accordance with SIPOS' Australian Publication No. 621956 | 7 | lots | 10 | slight |
| | | 7 | lots none | 10 10 | lots none |
| 11. | N6,6 (98.8%) Calcium Stearate (1.0%) | 4 | less | 8 | less |
| | N6,6 Yellow Dye (0.2%) | 8 | less | 8 | less |
| 12. | N6,6 (98.3%) Crodamide EBS Beads (1.5%) | 5 | less | 8 | less |
| | N6,6 Yellow Dye (0.2%) | 6, 5.5 | less | 8 | less |
| | N6,6 Yellow Dye (0.2%) | 4 | more | 11 | more |
| 13. | N6,6 (94.53%) Luwax OP ® Flakes (1.0%) MZ109D (2.75%) Crodamide ® EBS Beads (1.5%) N6,6 Yellow Dye (0.2%) Viton ® (0.02%) | 3 | same | 10 | same |
| 14. | N6,6 (94.53%) Luwax OP ® Flakes (1.0%) Epolene ® G-3003 Wax (2.75%) Crodamide ® EBS Beads (1.5%) N6,6 Yellow Dye (0.2%) Viton ® (0.02%) | 3 | same | 9 | same |
| 15. | N6,6 (92.03%) | 8 | slightly more | 11 | slightly more |
| | Epolene ® G-3003 Wax (2.75%) Crodamide ® EBS Beads (1.5%) Luwax OP ® Flakes (1.0%) N6,6 Yellow Dye (0.2%) Viton ® (0.02%) Dow Corning MB50-011 Silicone (2.5%) | | | | |
| 16. | N6,6 (92.03%) Luwax OP ® Flakes (1.0%) Dow Corning MB50-011 | 5 | more | 12 | slightly more |

TABLE X-continued

| Example No. | Film Description and Percentage by Weight of Additive | Instron Test Release Tension (g) | Residue | Hand Sample Release Test Release | Residue |
|---|---|---|---|---|---|
| | Silicone (2.5%) MZ109D (2.75%) Crodamide ® EBS Beads (1.5%) N6,6 Yellow Dye (0.2%) Viton ® (0.02%) | | | | |
| 17. | N6,6 (91.53%) Luwax OP ® Flakes (1.0%) Dow Corning MB50-011 Silicone (2.5%) MZ109D (2.75%) Crodamide ® EBS (1.5%) N6,6 Yellow Dye (0.2%) Irganox 1010 (0.5%) Viton ® (0.02%) | 10 | slightly more | 12 | slightly more |

N6,6 is Nylon 6,6

In the following Examples, there are described the preparations of films using different release agent materials:

RELEASE FILM SCOUTING WORK

PHASE I

Fabricated approximately 36 different samples and controls. The samples were made by melt blending Nylon 6,6 with test ingredients in a able-top extruder and pressing the blended polymer into a thin flat sample (3 to 5 mil) approximately 4 inches in diameter. The samples were made from a blend of 2% to 10% in the base resin. The samples were all tested with five different adhesive systems.

a) Super Glue (#8 LePage)

b) Polymer Foam ("Great Stuff")

c) Contact Adhesive Label d) Contact Cement (#6 LePage)

e) A Commercial Composite Molding Paste (one of many)

The ease of release was rated for each system and an overall rating made for each sample. The release from any of these materials is considered to be predictive for release from composite molding paste.

Results indicated the following materials to be above average: EBS/W40; Luwax OP; Teflon; silicone; graphite; Sax 7429; calcium stearate; molybdenum disulfide and boron nitride.

The compounds that tested above average were selected for further testing by cross-compounding each with the others in a systematic test plan using the same procedures as above.

The best release results were not universal, but appeared to be specific to one or two adhesives. In order for a sample to be above average, it must have tested high in release for at least two adhesive systems. All the samples were tested and rated and the overall score calculated.

The above average combinations were:

EBS/W40 and Teflon

EBS/W40 and silicone

EBS/W40 and graphite

EBS/40 and Sax 7429

EBS/40 and molybdenum disulfide

Luwax OP and Teflon

Luwax OP and silicone

Teflon and silicone

Teflon and Sax 7429 silicone and graphite silicone and Sax 7429 calcium stearate and molybdenum disulfide calcium stearate and boron nitride calcium stearate and Teflon calcium Stearate and silicone Other combinations of merit for a single adhesive was:

calcium stearate and graphite

Luwax OP and Sax 7429

Teflon and graphite

The following combinations would reasonably be expected to give good results:

a) Teflon, silicone and graphite in combination with molybdenum disulfide or boron nitride;

b) molybdenum disulfide mixed with boron nitride.

RELEASE TESTING PROCEDURES a) Each sample was prepared by "gluing" two sample disks together.

b) Allowing a 48 hr. curing time.

c) Pulling the samples apart and comparing the force to a standard.

Pure Nylon 6,6 zero

The best sample in the series was rated 10 (near zero force)

All others subjectively rated 0 to 10

TABLE XI

TABULATED RESULTS OF THE ABOVE AVERAGE TEST SAMPLES

| Blended Ingredients | Super Glue | Great Stuff | Contact Adhesive | Contact Cement | SMC Paste |
|---|---|---|---|---|---|
| Calcium Stearate & Teflon ® | | 8 | 5 | 10 | 5–6 |
| Calcium Stearate & Moly-disulfide | | 10 | | 10–11 | N/a |
| Calcium Stearate & Boron Nitride | | 10–12 | | 12 | N/a |
| Calcium Stearate & Graphite | | | | 10–11 | N/a |
| Calcium Stearate & Silicone | | 7–8 | 6–7 | 4 | 3–4 |
| EBS/W40** & Teflon ® | 4 | 9 | 6 | | 4 |
| EBS/W40 & Graphite | 6–7 | 10 | | | N/a |
| EBS/W40 & Sax 7429 ®*** | | 8 | 7 | | 4 |
| EBS/W40 & Silicone | | 9–10 | 9–10 | 5 | 4/6 |
| EBS/W40 & Moly-disulphide | | | 5 | 6–8 | N/a |
| Luwax OP & Teflon ® | 4/5 | 11 | 9 | | 4 |
| Luwax OP & Sax 7429 ® | 6 | 8 | | | |
| Luwax OP & Silicone | | 11 | 10–11 | 5–6 | |
| Teflon ® & Graphite | 5–6 | | | | |
| Teflon ® & Sax | 7 | 8–9 | | | |

TABLE XI-continued

TABULATED RESULTS OF THE ABOVE AVERAGE TEST SAMPLES

| Blended Ingredients | Super Glue | Great Stuff | Contact Adhesive | Contact Cement | SMC Paste |
|---|---|---|---|---|---|
| 7429 ® Teflon ® & Silicone | | 5–6 | 10–11 | | |
| Sax 7429 ® & Silicone | | 7 | 6 | | |
| Silicone & Graphite | | 8 | 10–11 | | |
| Nylon 6,6 Control | 0 | 0–2 | 0–1 | 0 | 2–3 |
| S701**** Control | 5–7 | 5 | 2–3 | 1–2 | 5 |
| Teflon ® Coated Film Control - Nylon 6,6 | 10 | 13–14 | 5 | 10 | 4 |
| Calcium Stearate Control - Modified (propylene) Nylon 6,6 | 3–4 | 10 | 3 | 4 | 7 |
| EBS/W40 Control- Modified (propylene) Nylon 6,6 | 6–7 | 6 | 4 | 0 | 3–4 |

*TEFLON is a registered trade-mark of E. I. duPont de Nemours and Company for the product polytetrafluoroethylene.
**EBS/W40 are commerical names for ethylene bis stearamide each obtained from a different manufacturer.
***Sax 7429 is maleic anhydride modified polypropylene.
****S701 is a nylon modified with polypropylene.
Teflon was incorporated in an amount of 5% by weight. All other release agents were incorporated in an amount of 2% by weight.

The invention may be varied in any number of ways as would be apparent to a person skilled in the art and all obvious equivalents and the like are meant to fall within the scope of this description and claims. The description is meant to serve as a guide to interpret the claims and not to limit them unnecessarily.

What is claimed is:

1. A film for adhering to a molding compound paste composite during its manufacture, said film being formed from a blend of a film forming polyamide resin and at least one release agent material selected from the group consisting of N, N' ethylene bis stearamide and polytetrafluoroethylene; N, N' ethylene bis stearamide and silicone; and N, N' ethylene bis stearamide and polypropylene; with the proviso that any modified polypropylene present does not exceed 3% by weight and wherein the release agent material is present in an amount such that after the paste composite is formed, substantially all of the film can be removed from the surface of the composite.

2. The film as claimed in claim 1 wherein the molded composite paste is selected from the group of composites consisting of SMC, TMC and BMC.

3. The film as claimed in claim 1 wherein the polyamide is selected from the group of all film forming, melt extrudable nylon resins.

4. The film as claimed in claim 3 wherein the polyamide is selected from the group consisting of Nylon 6,6, Nylon 6, blends of Nylon 6,6 and Nylon 6, and copolymers of hexamethylene diamine adipate and ε-caprolactam.

5. A film as claimed in claim 1 wherein the blend also comprises a dye in the amount of from about 0.1% by weight to about 0.5% by weight of the blend.

6. The film as claimed in claim 1 wherein the blend also comprises a dye in the amount of about 0.2% by weight of the blend.

7. The film as claimed in claim 1 wherein the release agent material comprises from about 1.0 to about 5.0% by weight based on the weight of the blend.

8. The film as claimed in claim 1 wherein the release agent material comprises from about 1.0 to about 3.0% by weight based on the weight of the blend.

9. The film as claimed in claim 1 wherein the release agent material comprises about 2.0% by weight based on the weight of the blend.

10. A film for adhering to a molding compound paste composite during its manufacture, said film being formed from a blend of a film forming polyamide resin and at least one release agent material selected from the group consisting of N, N' ethylene bis stearamide and polytetrafluoroethylene, N, N' ethylene bis stearamide and silicone; N, N' ethylene bis stearamide and polypropylene.

11. The film as claimed in claim 10 wherein the release agent material comprises from more than 1.0 to about 2.0% by weight, based on the weight of the blend.

12. The film as claimed in claim 10 wherein the polyamide is selected from the group of all film forming, melt extrudable Nylon resins.

13. The film as claimed in claim 10 wherein the polyamide is selected from the group consisting of Nylon 6,6, Nylon 6, blends of Nylon 6,6 and Nylon 6, and copolymers of hexamethylene diamine adipate and ε-caprolactam.

14. The film as claimed in claim 10 wherein the blend also comprises a dye in the amount of ftom about 0. 1% by weight to about 0.5% by weight of the blend.

15. The film as claimed in claim 10 wherein the blend also comprises a dye in the amount of about 0.2% by wt. of the blend.

16. The film as claimed in claim 10 wherein the release agent material comprises from about 1.0 to about 5.0% by weight based on the weight of the blend.

17. The film as claimed in claim 10 wherein the release agent material comprises from about 1.0 to about 3.0% by weight based on the weight of the blend.

18. The film as claimed in claim 10 wherein the release agent material comprises about 2.0% by weight based on the weight of the blend.

* * * * *